United States Patent [19]

Rosaen

[11] Patent Number: 4,966,697

[45] Date of Patent: Oct. 30, 1990

[54] FLUID FILTER RETAINING DEVICE

[76] Inventor: Nils N. Rosaen, 3333 Hilton Estates, Brighton, Mich. 48116

[21] Appl. No.: 365,676

[22] Filed: Jun. 13, 1989

[51] Int. Cl.$^5$ .............................................. B01D 29/13
[52] U.S. Cl. ..................................... 210/232; 210/339; 210/342; 210/450; 210/452; 210/484; 210/489
[58] Field of Search ............... 210/232, 237, 238, 411, 210/445, 450, 451, 452, 455, 470, 484, 342, 485, 489, 495, 338, 339

[56] References Cited

U.S. PATENT DOCUMENTS

| | | | |
|---|---|---|---|
| 1,506,967 | 9/1924 | Bosworth | 210/452 |
| 2,113,923 | 4/1938 | Miller | 210/453 |
| 2,982,413 | 5/1961 | Kraissl | 210/470 |
| 4,157,964 | 6/1979 | Rishel | 210/452 |
| 4,388,191 | 6/1983 | Morgan | 210/452 |
| 4,419,240 | 12/1983 | Rosaen | 210/450 |

*Primary Examiner*—W. Gary Jones
*Assistant Examiner*—Matthew O. Savage

*Attorney, Agent, or Firm*—Gifford, Groh, Sprinkle, Patmore and Anderson

[57] ABSTRACT

A fluid filtering device includes a housing having an interior chamber with an open top and an inlet and outlet open to the chamber. An annular seat is secured to the housing within the chamber in a position spaced downwardly from the open top so that the seat protrudes inwardly into the chamber. A filter element is removably insertable into the chamber through its open top and to a filtering postion in which the filter element is positioned between the housing inlet and outlet. The filter element includes an outwardly flanged portion which abuts against the seat when the filter element is in its filtering position. A cover is detachably secured over the open top of a housing and a spring member is secured at one end to the filter element to extend upwardly to abut against the cover and secure the filter element in position against any loss of seal with respect to the housing during operation of the filtering device. A handle is mounted to the filter element to facilitate removal and insertion of the filter element.

3 Claims, 1 Drawing Sheet

U.S. Patent
Oct. 30, 1990
4,966,697
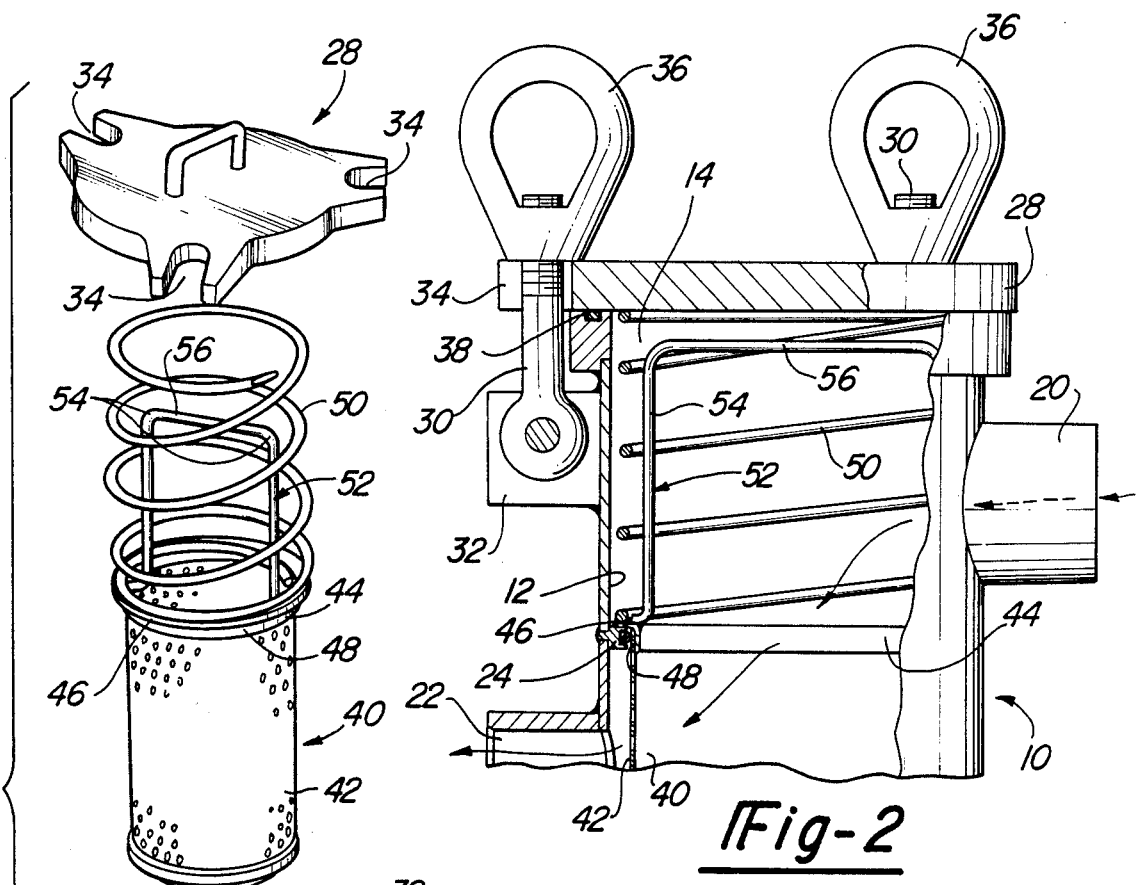
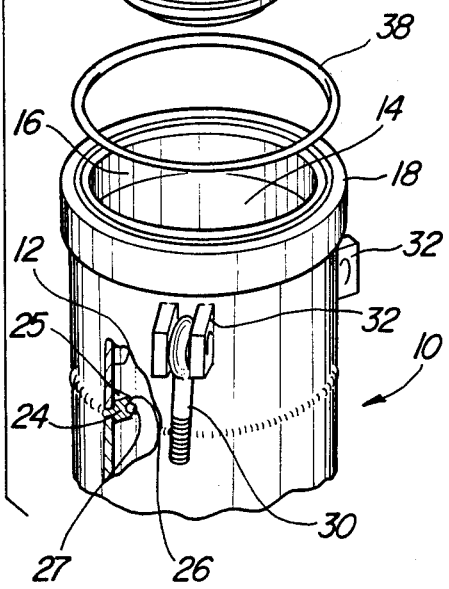
Fig-1
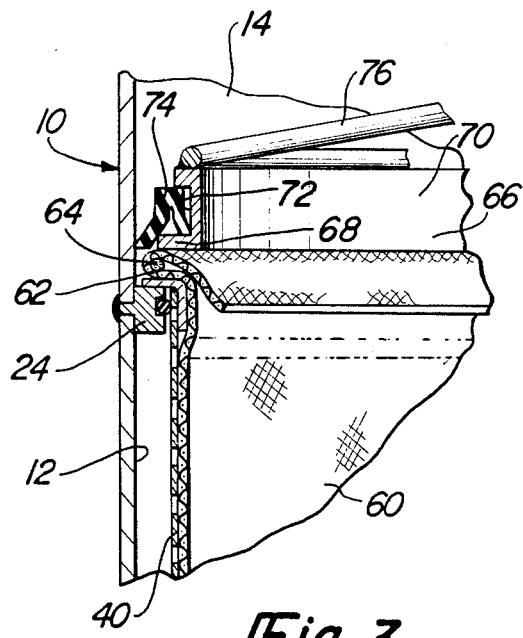

FLUID FILTER RETAINING DEVICE

BACKGROUND OF THE INVENTION

I. Field of the Invention

The present invention relates generally to fluid filtering devices and, more particularly to fluid filtering devices having a removable filter element

II. Description of the Prior Art

Fluid filtering devices having a removable cover and a housing which defines an interior chamber and having both an inlet and outlet open to the chamber are well known in the art. The cover of these previously known filtering devices is removable from the housing to expose an open top through which a filter element is insertable to a filtering position within the interior chamber. In the filtering position, fluid flowing between the housing inlet and the outlet presses through the filter element. The filter element includes an outwardly extending radial flange which abuts against an annular seat in the housing to seal the filter element and housing together.

For filtering devices operable with fluid moving at a high rate of flow, it is necessary to secure the filter element in position within the housing to prevent tippage of the filter element. Even the slightest tipping of the filter element permits leakage around the filter element so that unfiltered fluid may enter the influent from the device.

It is known, as disclosed in U. S. Pat. No. 4,419,240 to B. Rosaen, to provide the filter element with a generally U-shaped handle. The handle is secured at its free ends to the filter element and extends upwardly to a top portion positioned adjacent to the intersection of the cover with the housing. The handle facilitates both insertion and removal of the filter element into and out of the housing chamber. Additionally, the handle biasingly secures the filter element from movement during operation of the filtering device and during backflushing. However, such handles are easily deformed by the weight of the filter unit and friction of the seal during insertion or removal of the filter element. Because of the variety of the sizing of the elements of the available housings, the variety in the port sizes, and the dimensions between the seat and cover, a great number of handle sizes and shapes must be produced to accomodate the variety of sizes of the housings. Additionally, close tolerances in the handle length must be held to provide a proper fit within the housing and sufficient biasing force to hold the filter unit in position during both normal and backflushing operations, thereby increasing the cost of the filter unit.

SUMMARY OF THE PRESENT INVENTION

The present invention provides a fluid filtering device which overcomes the above-mentioned disadvantages of the previously known devices.

The fluid filtering device of the present invention includes an elongated housing having a surface defining an interior chamber and inlet and outlet open to the chamber. The housing is open at its top and is provided with an annular seat within the chamber. The seat has a top surface and a seal. The seat is spaced downwardly from the open top of the housing and is affixed to the housing. A filter element having an outwardly flanged portion at one end and a cylindrical surface extending axially downwardly from the flanged portion is insertable through the open top housing to a filtering position. In the filtering position, the outwardly flanged portion of the filter element abuts against the top surface of the seat to limit the downward insertion of the filter to the chamber. The cylindrical surface of the filter element sealingly engages the seal. When the filter element is in the filtering position, influent must pass through the filter element before passing through the housing outlet.

An elongated spring member having a diameter greater than the inner diameter of the flanged portion is affixed to the filter element to extend between the cover and the filter element. The spring member acts to bias the filter element in position despite changes in the flow of the fluid caused by backflushing or reverse flow surges from valve shifting. The spring member may be grasped to facilitate insertion and removal of the filter unit. A handle member may be affixed to the filter element to extend within the spring, for facilitating removal of the filter unit from the housing.

An embodiment of the invention for use with filter liners which are inserted inside of the filtering unit to provide a finer filtering is also disclosed. A ring having an outwardly extending annular gasket is affixed to one end of the spring. The ring is positioned in abutment with the filter bag and the gasket extends to provide a seal between the housing and ring to prevent the influent from bypassing the filter bag. The spring acts to hold the filter bag and filter unit in position within the housing.

Brief Description of the Drawing

A better understanding of the present invention will be had upon reference to the following detailed description when read in conjunction with the accompanying drawing, wherein like character references refer to like parts throughout the several views, in which:

FIG. 1 is an exploded partial perspective view of the preferred embodiment of the invention;

FIG. 2 is a partial sectional view showing a preferred embodiment of the filter device of the present invention in position for use; and FIG. 3 is a fragmentary sectional view showing a portion of an alternative embodiment of the invention.

DETAILED DESCRIPTION OF THE PREFERRED EMBODIMENT OF THE PRESENT INVENTION

With reference first to FIGS. 1 and 2, a preferred embodiment of the filter device according to the present invention is thereshown as having a housing 10, a cover 28, and a filter element 40. The elongated housing 10 has a cylindrical interior wall 12 which defines an interior and generally cylindrical chamber 14. The housing is closed as its lower end (not shown) but has an opening 16 at the top 18.

As shown in FIG. 2, a fluid inlet 20 extends outwardly from the housing 10 and is open to the interior chamber 14. Similarly, a fluid outlet 22 is open to the interior chamber 14 and extends outwardly from the housing 10. Both the fluid inlet 20 and the fluid outlet 22 extend substantially radially outwardly from the housing 10 while the fluid inlet 20 is positioned axially above the fluid outlet 22. The fluid inlet 20 and the fluid outlet 22 are conventional in construction and may assume other configurations and positions along the housing 10 without deviation from the spirit or scope of the invention.

With reference now to FIG. 1, an annular seat 24 having a radially extending top surface 25 and an axially extending surface 26 is either secured to or formed as a part of the housing 10. The seat 24 protrudes radially inwardly into the chamber 14 at a position between the housing inlet 20 and the outlet 22. The seat 24 carries a conventional fluid seal 27, such as an 0-ring, along and preferably at the midpoint of the axially extending surface 26.

As shown in FIGS. 1 and 2, the cover 28 is detachably secured over the opening 16 of the housing 10. Although any conventional means may be used to secure the cover 28 to the housing 10, the preferred manner as shown in the drawing, includes three circumferentially spaced bolts 30 pivotally secured at one end to mounting brackets 32 secured to the exterior of the housing 10. The bolts 30 are pivotal through receiving slots 34 formed in the cover 28. Nuts 36 then threadably engage each of the bolts 30 so, that upon tightening, the nuts 36 secure the cover 28 to the housing 10. A seal 38 carried around the top 18 of the housing 10 fluidly seals the cover 28 to the housing 10.

Referring now to FIG. 1, with the cover 28 removed from the housing 10, a filter element 40 is insertable through the opening 16 of the housing 10 and into the housing chamber 14. The filter element 40 includes a tubular and cylindrical filter media 42 and an annular mounting member 44 secured to one end of the media 42. The mounting member 44 includes an outwardly extending flange 46 and a cylindrical outer surface 48 which extends axially downwardly from the flange 46. When the filter element 40 is in a filtering position, the flange 46 abuts against the radially extending top surface 25 of the seat 24 and, simultaneously, the fluid seal 27 sealingly engages the cylindrical outer surface 48 of the mounting member 44. In doing so, the filter media 42 is fluidly positioned between the inlet 20 and the outlet 22.

A coil spring 50 is mounted to the flange 46 to extend in an uncompressed condition axially from the flange 46 to beyond the top 18 of the housing 10. When the cover 28 is locked in position as shown in FIG. 2, the spring 50 is compressed between the flange 46 and the cover 28 to biasingly hold the filter element 40 in position. The spring 50 is mounted to the flange 46 by any suitable manner, such as welding, and is formed of a material suitable for use with the fluid to be filtered. The spring 50 may be of any suitable type capable of exerting a sufficient force on the mounting member 44 to hold the filter element 40 in position against surges, backflows and high flow systems. The velocity of fluid is sufficient to generate enough force to displace the filter element 40. The spring 50 has a diameter greater than the inner diameter of the mounting member 44.

The filter element 40 may be removed by grasping the spring 50 directly or providing a U-shaped handle 52 mounted at its free ends to the mounting member 44. The handle 52 has a pair of upright portions 54 extending from the mounting member 44 within the spring 50 to a crossconnecting portion 56. The pair of upright portions 54 extend in the direction of the top of the housing 10, but stop short of the top, so that the crossconnecting portion 56 does not contact the cover 28 when it is locked in position on the housing 10.

With reference now particularly to FIG. 3, for fluid filtering applications where it is desirable to have dual filtering action, a filter liner 60 having an outwardly flared portion 62 at one end is insertable through the open top 18 of the housing 10 and into the interior of the filter media 42. The outwardly flared liner portion 62 is formed about a ring 64 to retain the flared portion 62 on the flange 46 of the mounting member 44.

Still referring to FIG. 3, a retaining ring member 66 having a flat radial surface 68 is positioned within the chamber with the surface 68 abutting the outwardly flared liner portion 62. The retaining ring member 66 has a central aperture 70 to receive fluid for filtering. The retaining ring member 66 has an annular groove 72 to accept a flexible seal 74. The seal 74 has a flared portion extending between the retaining ring member 66 and the interior wall 12 of the housing 10 to maintain all fluid entering the chamber 14 from the inlet 20 to pass through the aperture 70 and through the filter liner 60. A spring 76 is mounted to the retaining ring member 66 to extend to the cover 28 and to bias the retaining ring member 66 in position as in the manner as set forth above.

Thus, the filter liner 60 is maintained in the filtering position against tipping with the fluid flow passing sequentially through the filter inlet 20, the liner 60, the filter media 42, and out through the outlet 22. The spring 76 also acts to bias the retaining member 66, the filter liner 60 and filter element 40 in position during surges and backflows occurring in the flow passing through the filter element 40.

While I have described a preferred embodiment of my invention, it should be apparent to one having ordinary skill in this art that many modifications and changes can be made to the preferred embodiment without departing from the spirit of the present invention as expressed by the scope of the appended claims.

I claim:

1. A filtering device for use with a fluid flow system, said filtering device comprising:
    a housing having an axially extending interior chamber, an open top, said housing having an inlet and an outlet open to said chamber, said inlet connected to said fluid flow system;
    said housing having a seat formed within said chamber at a position spaced downwardly from said open top, said seat extending radially into said chamber and having an annular surface;
    a cover member detachably mounted to said housing to extend over said open top;
    means for detachably mounting said cover to said housing; and
    a filter unit removably insertable into said chamber through said open top to a filtering position in which said filter unit is positioned between said inlet and said outlet, said filter unit having a filter element with a continuous flange portion in abutment with said seat, a filter liner having a flared top portion and an elongated portion, said elongated portion being positioned within said filter element with said flared portion positioned between said flange, and a biasing means, said biasing means comprising a retaining ring member and a spring member mounted to said retaining ring member, said retaining ring member being positioned in abutment with said flared portion of said filter liner to maintain said filter liner and filter element in position against said seat.

2. The invention as defined in claim 1 wherein said retaining ring member further comprises a groove and means for sealing mounted in said groove, said means for sealing extending between said housing and said retaining ring member to prevent fluid from passing therebetween.

3. The filtering device of claim 2 wherein said spring member is a coil spring having a central aperture.

* * * * *